(12) United States Patent
Nelson et al.

(10) Patent No.: US 10,808,166 B2
(45) Date of Patent: Oct. 20, 2020

(54) PRODUCED WATER BORATE CROSSLINKING COMPOSITIONS AND METHOD OF USE

(71) Applicant: Solvay USA Inc., Princeton, NJ (US)

(72) Inventors: Tyler Heath Nelson, Midland, TX (US); Stephen Anthony Glover, Odessa, TX (US); Enrique Lopez, Midland, TX (US)

(73) Assignee: SOLVAY USA INC., Princeton, NJ (US)

( * ) Notice: Subject to any disclaimer, the term of this patent is extended or adjusted under 35 U.S.C. 154(b) by 225 days.

(21) Appl. No.: 15/234,701

(22) Filed: Aug. 11, 2016

(65) Prior Publication Data

US 2016/0347992 A1    Dec. 1, 2016

Related U.S. Application Data

(62) Division of application No. 13/915,436, filed on Jun. 11, 2013.

(51) Int. Cl.
  *C09K 8/90* (2006.01)
  *C09K 8/68* (2006.01)
  *C09K 8/88* (2006.01)
(52) U.S. Cl.
  CPC .............. *C09K 8/685* (2013.01); *C09K 8/887* (2013.01); *C09K 8/90* (2013.01)

(58) Field of Classification Search
  None
  See application file for complete search history.

(56) References Cited

U.S. PATENT DOCUMENTS

| | | | |
|---|---|---|---|
| 6,070,664 A * | 6/2000 | Dalrymple | C09K 8/508 166/281 |
| 6,177,385 B1 | 1/2001 | Nimerick | |
| 6,227,295 B1 * | 5/2001 | Mitchell | C09K 8/685 166/300 |
| 6,767,868 B2 | 7/2004 | Dawson et al. | |
| 2003/0092584 A1 | 5/2003 | Crews | |
| 2004/0211566 A1 | 10/2004 | Slabaugh et al. | |
| 2007/0114035 A1 | 5/2007 | Parris et al. | |
| 2009/0023614 A1 * | 1/2009 | Sullivan | C09K 8/68 507/214 |
| 2012/0129738 A1 | 5/2012 | Gupta et al. | |

* cited by examiner

Primary Examiner — Jeffrey D Washville

(57) ABSTRACT

A composition and method for treating a fracturing fluid comprising produced water with high levels of dissolved solids using a polymer crosslinked with a boron compound and a high pH alkylamine buffer. The composition improves the viscosity stability of the fracturing fluid at elevated bottom-hole temperatures, particularly when the fluid has high levels of calcium and magnesium. The composition is particularly useful with polysaccharides, including galactomannan gums, such as guar gum, locust bean gum, and karaya gum, and allows for the use of the preferred boron compound crosslinkers in high total dissolved solids fracturing fluids without the pH destabilization problems encountered with the prior art.

5 Claims, 2 Drawing Sheets

PRODUCED WATER BORATE CROSSLINKING COMPOSITIONS AND METHOD OF USE

CROSS-REFERENCE TO RELATED APPLICATION

This application is a divisional of U.S. patent application Ser. No. 13/915,436, filed Jun. 11, 2013, which is incorporated herein by reference in its entirety.

BACKGROUND OF THE INVENTION

1. Field of the Invention

This invention relates to a composition and method for treating fluids having high levels of total dissolved solids, such as produced water, with a boron crosslinked polymer and pH buffer to improve the functionality and stability of the viscosity of the fluid for use in oil and gas operations, particularly in fracturing operations.

2. Description of Related Art

Large amounts of the world's oil and gas reserves are contained in formations where extraction is more difficult. With increasing prices for oil and natural gas and the positive environmental aspects of its use as a fuel source, there is greater demand for technologies to efficiently extract and recover oil and natural gas from these formations. One technique that has been developed to stimulate production in these formations is hydraulic fracturing. Using this technique, a fracturing fluid is pumped into a well under sufficient pressure to fracture the face of the mineral formation throughout the formation. Fracturing releases the hydrocarbon trapped within the formation and the hydrocarbon may then be extracted through the well. As the pressure on the face of the fractured mineral is released to allow for the extraction of the hydrocarbon fuel, the fracture in the formation would normally close again. However, proppants, such as course sand or sintered bauxite, are often added to the fracturing fluid to hold the fractures open, thereby increasing the effectiveness of the fracturing fluid. The fractures, held open by the proppants, form a channel through which the trapped hydrocarbons may escape after pressure is released thereby increasing oil and gas production.

Water from various sources is commonly used as the primary fluid in fracturing fluids. The operations typically require large amounts of water, up to several million gallons per well, which may be supplied from nearby fresh water ponds, lakes, rivers, fresh water subterranean aquifers, etc. Ideally, produced waters (both ground water and recovered injected water) from existing wells in the area are used as a water source to reduce water costs, recycle the produced waters that would otherwise be injected into a disposal well, and conserve fresh water resources. There is generally an abundant amount of produced waters available since produced waters can make up to around 90% of the total fluids produced per day in some wells. These water sources, and particularly produced waters, typically contain high levels of total dissolved solids (TDS), such as calcium, magnesium, chloride, bicarbonate, sulfate, iron, etc. According to the United States Geological Service National Produced Water Database, the TDS in produced water varies from less than 1,000 mg/liter to 399,943 mg/liter (based on more than 50,000 samples), depending on location. The TDS more commonly ranged from 10,000 to 100,000 mg/liter which comprised 42.3% of the samples. 25.2% were within 100,000 to 200,000 TDS and 12.7% were greater than 200,000 TDS.

Polymeric thickening agents are typically added to the fracturing fluid to increase the viscosity of the fluid, which helps prevent leak-off into the formation, decrease friction losses, and suspend and transport the proppant materials. Galactomannan gums and derivatives thereof, such as guar, HPG, CMHPG, and CMG are frequently used as the polymeric thickening agent. When hydrated, these polymers form gels that increase the viscosity of the fracturing fluid. Further increases in viscosity are achieved by crosslinking the polymer with a crosslinking agent. Boron, zirconium, and titanium compounds are common crosslinking agents. Crosslinking requires a certain pH level, depending on the polymer and crosslinker used, in order to maintain the crosslinking between the crosslinker and polymer.

Crosslinking with boron is generally preferred for guar polymers and some guar derivatives, such as HPG; however, it can be difficult to maintain the stable pH needed. For crosslinking with boron compounds, the guar gum polymer is first hydrated to form a gel under neutral or acidic conditions. The hydrated guar is then mixed with a boron compound, such as boron salts or boric acid, and the pH elevated to crosslink the hydrated guar and borate. The crosslinking will not occur at pH values less than about 8.0 and is preferably carried out at a pH above 9.0. The crosslinking is also reversible if the pH drops below these levels.

Maintaining an adequate pH level to avoid reversal of the crosslinking is a problem frequently encountered in fracturing operations. If the crosslinking is reversed, the viscosity of the fracturing fluid will decrease. Higher bottom hole temperatures are known to lower pH values and can cause degradation of the crosslinked polymer. Bottom hole temperatures in fracturing operations are normally greater than 80° F., and can be greater than 250° F., which is high enough to adversely impact the pH and the viscosity of the fracturing fluid.

One way the prior art has addressed this problem is to increase the initial loading of polymer. The use of up to 100 pounds of galactomannan gum per 1,000 gallons of total fracturing fluid has been disclosed, with higher amounts of gum required for higher temperatures and higher salt content, in order to maintain sufficient viscosity. This has the drawback of increasing the costs of the fracturing operation, both in added raw materials and in increased power requirements. Having a very high initial viscosity requires greater horsepower to pump the fluid through the wellbore. Additionally, increasing the initial loading of polymer alone is not effective in maintaining a stable viscosity in fracturing fluids with high TDS levels. Another way the prior art has addressed this problem is to add a pH buffer to the fracturing fluid as a stabilizer. However, many of these buffers will react with ions in high TDS fracturing fluids, making them ineffective for use in operations where produced waters are used as a source of fracturing fluid.

Although boron crosslink guar fluids are generally preferred, they are not normally used in fracturing fluids comprising high TDS produced water because of the difficulty in elevating and maintaining a stable pH (9.0-12.0) required for crosslink stability at bottom hole temperatures. Potassium hydroxide, sodium hydroxide, ammonium hydroxide, potassium carbonate, and mixtures thereof are common pH buffers used with boron crosslinked guar fluids in fracturing operations. While these pH buffers are usually sufficient to stabilize the fluid in fresh waters, these buffers react with the dissolved solids in high TDS fluids, particularly calcium and magnesium. Produced waters can contain calcium and magnesium levels well in excess of 500 ppm and 150 ppm, respectively. At ambient and elevated temperatures in the range of 80° F. to 200° F. (or higher), like those bottom-hole temperatures found in fracturing operations, the magnesium and calcium ions combine with available hydroxide ions from the pH buffer to form magnesium or calcium hydroxides or carbonates, which precipitate out of solution. These and other precipitates are undesirable because they may adversely affect the permeability of the formation or cause damage to the equipment. This reaction also depletes the pH buffer and results in the inability to sufficiently stabilize the pH at the necessary elevated level. Often erratic or unstable crosslink fluids result.

Because of these issues, guar polymers and guar-derivative polymers are not normally considered candidates for crosslinking with boron in high TDS fracturing fluids such as produced waters, and boron crosslinking is often limited to water sources having less than 1,500 ppm total dissolved solids particularly with calcium and magnesium levels less than 500 ppm and 150 ppm respectively (primarily fresh water sources). These guar and guar-derivative polymers are commonly crosslinked with a zirconium crosslinker at a pH of about 7.5 or less where high TDS produced waters or mixtures of produced and fresh waters are used as the fracturing fluid. Crosslinking with a zirconium crosslinker at higher pH values of 9.0 or greater is also possible with fracturing fluids containing greater amounts of fresh water and low TDS values. Some zirconium crosslinkers are thermally activated where crosslinking is achieved when the fluid temperature is elevated in transit to or at bottom-hole temperatures. Crosslinked bonds with zirconium are covalent (fixed) types bonds, so once crosslinked maintaining the pH level is not normally critical to maintaining the crosslink. Crosslinked bonds with boron crosslinkers are normally ionic (reversible) type bonds, so maintaining the pH level for the duration of the treatment is critical in order to maintain the crosslinking bond with guar polymer and guar-derivative polymers. Although boron crosslinkers require greater pH stability, they have some advantages over zirconium crosslinkers. Boron crosslinkers are generally less expensive than zirconium crosslinkers and have the ability to re-crosslink (heal) after shear or when the crosslink is broken by lowering the pH if the pH becomes elevated again, unlike zirconium crosslinks that are generally considered brittle and do not re-crosslink once broken. Boron crosslinks are also much less sensitive to critical crosslinker and pH buffer chemical fluctuations and hence more forgiving than zirconium crosslinks. For example, as little as 0.2 gpt excess zirconium crosslinker has been known to break the crosslink. Also, boron crosslinks are preferred for their ability to minimize post frac damage due to the ability to un-crosslink after the treatment with the lowering of the fluid pH as the formation returns to its pH at equilibrium, which is normally considered to be less than 7.5. A breaker, which is commonly added to break the polymer strand to reduce the viscosity of the fracturing fluid when the fracturing operation is complete, can break the polymer strand more efficiently when the boron crosslink has been reversed. The zirconium crosslink, lacking this ability, is maintained during and after the treatment due to its fixed covalent bond. The breaker must react with both the stable crosslink and polymer when a zirconium crosslinker is used and it is generally more difficult to break.

SUMMARY OF THE INVENTION

This invention relates to a composition and method for treating produced water with high levels of dissolved solids using a polymer crosslinked with a boron compound and a high pH alkylamine buffer. The composition improves the pH stability and maintains a stable crosslinked fracturing fluid at elevated bottom-hole temperatures, particularly when the fluid has high levels of calcium and magnesium. Although the viscosity of fracturing fluid can vary depending on the type and concentration of polymer, crosslinker, buffer, temperature, and concentrations of the various components added to the fracturing fluid, maintaining a stable elevated pH prevents the crosslinking bond between the boron compound and the polymer from reversing, which aids in maintaining a sufficiently high viscosity to transport proppants and control leak-off. The composition is particularly useful with polysaccharides, including galactomannan gums, such as guar gum, locust bean gum, and karaya gum, or their derivatives and allows for the use of the preferred boron compound crosslinkers in high TDS fracturing fluids without the pH destabilization problems encountered with the prior art.

One preferred composition according to the invention comprises a polysaccharide (preferably a galactomannan gum polymer), a boron compound crosslinker, and an alkylamine pH buffer (preferably diethylenetriamine or its related compounds). According to another preferred composition, the pH buffer may be any basic organic compound comprising amines, including akyl amines, aryl amines, poly amines, and cyclo amines, and may be primary, secondary, or tertiary amines, whereas the basic compounds yield a pH greater than about 8.0 when dissolved in water. Examples of such compounds include n-butylamine, diethylenetriamine (DETA), diaminobutane, diethyldiamine, diisopropylamine, dodecylamine, ethylamine, ethylenediamine, di-(gamma-aminopropylether), methyleneamine, piperazine, triethylenetetramine, tetraethylenepentamine, triethylamine, and amino diols, glycols and poly glycols. Other compounds that yield a pH greater than about 8.0 when dissolved in water and comprise amines may also be used as will be understood by those of ordinary skill in the art. Another preferred composition according to the invention also comprises a secondary pH buffer or pH modifier. The secondary pH buffer or modifier is preferably a strongly alkaline hydroxide and/or carbonate compound, such as potassium hydroxide, sodium hydroxide, ammonium hydroxide, potassium carbonate, or mixtures thereof. These embodiments of compositions according to the invention are added to fracturing fluids containing TDS levels in the range of about 1,500 ppm to 400,000 ppm and preferably containing calcium levels in excess of about 500 ppm and/or magnesium levels in excess of about 150 ppm. These compositions allow stable crosslinking of the polymer and the crosslinking agent at high bottom hole temperatures in the range of about 80° F. to 250° F., where prior art crosslinking usually fails, particularly in the presence of high levels of hardness (from calcium, magnesium, and other dissolved minerals) and particularly where guar or guar related polymers are crosslinked with boron compounds.

According to a preferred embodiment for using a preferred composition according to the invention, a polymer is first hydrated and added to the fracturing fluid, which contains water sources with TDS levels in the range of about 1,500 ppm to 400,000 ppm, such as produced waters or mixtures of produced waters and fresh waters. Then a crosslinking agent, amine pH buffer, and optionally a secondary pH buffer are added to the fracturing fluid containing the hydrated polymer. The crosslinking agent and amine pH buffer may be pre-mixed in a solution prior to adding to the fracturing fluid, with a secondary pH buffer and/or additional amine pH buffer (which may further stabilize the crosslinked fluid) optionally added separately. Alternatively, the crosslinking agent and secondary pH buffer may be pre-mixed in a solution prior to adding to the fracturing fluid, with the amine pH buffer added separately. As another alternative, the crosslinking agent, amine pH buffer, and secondary pH buffer (if used) may all be added to the fracturing fluid separately.

When pre-mixed, the crosslinker-amine solution is added in a concentration from 0.25 gpt (gallons per thousand gallons of fluid, including the fracturing fluid) to 30 gpt and more preferably from 1 gpt to 10 gpt. When pre-mixed, the crosslinker-secondary buffer solution is added in a concentration from about 0.25 gpt to 20 gpt, and more preferably from about 1 gpt to 10 gpt. When the amine pH buffer is separately added to the fracturing fluid with the crosslinker/buffer solution (either the crosslinker-secondary pH buffer solution or as additional amine pH buffer added with the crosslinker-amine solution), preferably between 0.25 gpt to 30 gpt, and more preferably from 0.25 gpt to 10 gpt, is used. When all of these compounds are added separately, preferably between about 0.41 ppt (pounds per thousand gallons of fluid, including the amount of fracturing fluid) to about 65.22 ppt, and most preferably about 3 ppt to about 11 ppt, of the crosslinking agent is used and about 0.25 gpt to about 20 gpt, and most preferably about 0.25 gpt to about 10 gpt, of the secondary pH buffer is used (if desired). The concentrations of these compounds or solutions will vary depending on the hardness of the water used in the fracturing fluid and the bottom-hole temperature.

BRIEF DESCRIPTION OF THE DRAWINGS

The composition of the invention is further described and explained in relation to the following drawings wherein.

DESCRIPTION OF THE PREFERRED EMBODIMENTS

Figure 1:
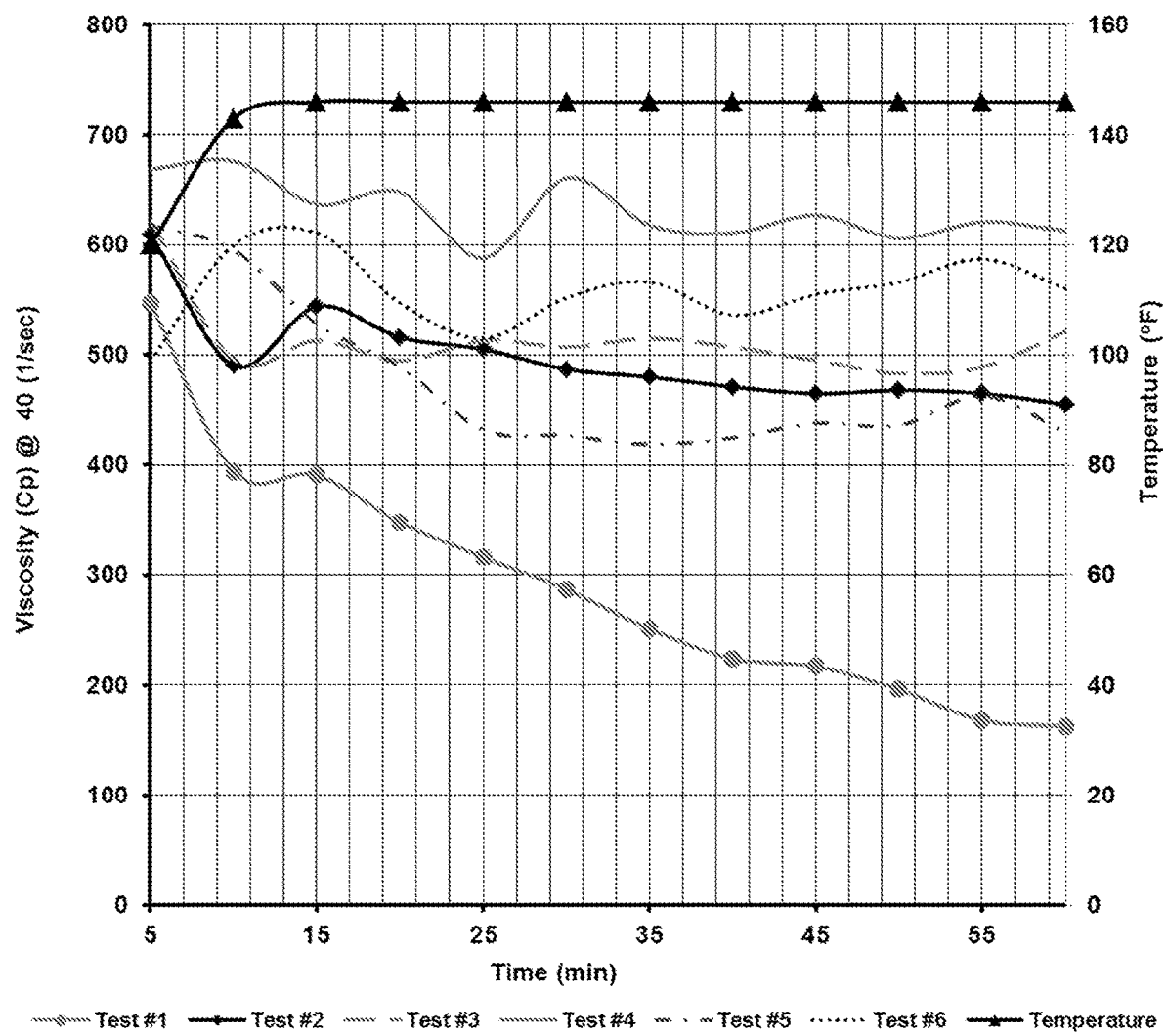
FIG. 1 is a graphical representation of the viscosity over time for several compositions tested.

One preferred treatment composition according to the invention comprises a boron-crosslinkable polysaccharide as the polymer, a boron compound crosslinker, and an amine high pH buffer. This preferred composition comprises about 5 to about 100 ppt (pounds per thousand gallons of total fluid, including the fracturing fluid) polysaccharide, between about 0.41 ppt to about 65.22 ppt, and most preferably about 3 ppt to about 11 ppt, of the crosslinking agent, and about 0.25 gpt to 30 gpt amine pH buffer.

The polysaccharide is preferably in a slurry with a hydrocarbon base, containing about 3-5 pounds of polysaccharide per one gallon of the slurry. The preferred polymer is a galactomannan gum, with guar gum being the most preferred polymer, but other hydratable water-soluble polymer solutions suitable for use in creating a crosslinked fracturing fluids, and particularly any of the hydratable polysaccharides that are capable of gelling water based fluids may be used. Suitable polymers are galactomannan gums, guars, locust bean gum, tara gum, karaya gum, *cassia* gum, hydroxypropyl guar, carboxymethyl guar, carboxymethylhydroxypropyl guar, carboxymethyl hydroxyethylcellulose, carboxymethylcellulose, carboxymethyl hydroxyethyl cellulose and hydroxyethyl cellulose, and other derivatized guars and cellulose derivatives, and polyvinyl alcohol. The polymer is hydrated with water in the fracturing fluid to form a viscosified or gelled fluid.

The preferred boron compound crosslinker is boric acid, but other boron containing compounds such as borax, sodium borate, disodium tetraborate, sodium tetraborate, sodium tetraborate decahydrate, amino boric acid, elluite, ulexite, colemanite, probertite, and mixes thereof may be used. Additionally, other non-boron crosslinking agents may be used, but the combination of sufficient viscosity and improved stability achieved with boron compound crosslinkers makes them particularly suitable for use in compositions according to the invention. DETA is the preferred amine pH buffer, but other alkylamines may also be used alone or may be used in combination with DETA. Other basic organic compounds comprising amines (including akyl amines, aryl amines, poly amines, and cyclo amines, and may be primary, secondary, or tertiary amines) may also be used as an amine high pH buffer. These basic compounds yield a pH greater than about 8.0 when dissolved in water, preferably greater than about 10.0, and most preferably yield a pH in the range of 12-13. Examples of such compounds include n-butylamine, diethylenetriamine (DETA), diaminobutane, diethyldiamine, diisopropylamine, dodecylamine, ethylamine, ethylenediamine, di-(gamma-aminopropyl-ether), methyleneamine, piperazine, triethylenetetramine, tetraethylenepentamine, triethylamine, and amino diols, glycols and poly glycols. These basic compounds comprising amines do not have the hydroxide or carbonate radicals common in most high pH buffers (such as sodium hydroxide or potassium carbonate) which precipitate with high levels of hardness (such as calcium and magnesium), thereby reducing the buffering effect. The reaction of the preferred amine pH buffer, DETA, with magnesium and calcium is minimal. As such, the use of these amine pH buffers, such as DETA, are useful in mitigating precipitating reactions with water hardness, such as calcium and magnesium, and are more effective in maintaining a stable pH in high hardness or high TDS waters such as hard fresh waters, produced waters and mixtures thereof.

According to another embodiment, the composition also comprises a secondary alkaline pH buffer or pH modifier. The secondary pH buffer or modifier is preferably a strongly alkaline hydroxide and/or carbonate compound, such as potassium hydroxide, sodium hydroxide, ammonium hydroxide, potassium carbonate, or mixtures thereof. Although some precipitation may occur when using such secondary pH buffers with high TDS, and particularly high calcium and magnesium levels, the addition of the amine pH buffer may inhibit the reaction that results in the precipitation. The addition of a secondary pH buffer is optional and is not required. When added to the fracturing fluid, the composition according to this embodiment preferably comprises about 4.0 to about 6.0 gpt polysaccharide slurry (containing about 3-5 lbs. of polymer per gallon of slurry), about 1.5 to about 4.0 gpt crosslinking agent-secondary pH buffer solution, and about 0.5 to about 5.0 gpt amine pH buffer.

Other additives typically used in fracturing fluids, such as biocides, breakers, clay control additives, scale inhibitors, surfactants, water recovery agents, polymer hydration enhancers, high temperature gel stabilizers such as sodium and or ammonium thiosulfate, etc., and proppants may also be used. It is preferred to use 0.1-2.0 gpt biocide and 0.04 to 0.06 gpt low pH buffer (an 80% acetic acid solution is preferred) with the compositions according to the invention. The addition of an acidic low pH buffer may aid in hydration of the polymer, which occurs best at neutral to acidic conditions, so it is preferred to add the low pH buffer with, or near the same time as, the polymer. Although the amount of low pH buffer added is typically not enough to significantly drop the pH level of the fluid, in the tests discussed below, the 80% acetic acid solution was added with the biocide, polymer (a guar and oil slurry), and produced water, which resulted in a pH of 7.05. Prior to addition of the 80% acetic acid solution, the pH of the other components was 7.42.

These embodiments are preferably used with fracturing fluids having TDS levels in the range of about 1,500 ppm to 400,000 ppm and most preferably in the range of about 5,000 ppm to 200,000 ppm or in waters where the precipitation of water hardness (such as from calcium or magnesium) significantly reduce the stability of the boron crosslink due to the precipitation of commonly used high pH buffers such as hydroxide and/or carbonate based buffers. Such fracturing fluids preferably contain calcium levels in excess of about 500 ppm and/or magnesium levels in excess of about 150 ppm. The required pH level to maintain a stable crosslink between the preferred guar gum polymer and boron crosslinker can vary depending on the temperature, level of TDS, and other factors, but a pH of between 9.0 and 12.0 is preferred. To achieve these pH levels and maintain a stable level at elevated bottom hole temperatures with high TDS fluids, it is preferred that about 0.41 ppt to about 65.22 ppt, and most preferably about 3 ppt to about 11 ppt, of the crosslinking agent is used. When boric acid is used as the crosslinking agent, the preferred amount of boric acid used is about 4 ppt to about 11 ppt, and most preferably from about 4.4 ppt to about 10 ppt. Most preferably, the concentration of amine pH buffer used is about 0.5 gpt to about 10 gpt. It is also preferred that about 5 ppt to about 100 ppt polymer is used. Most preferably, the concentration of polymer used is about 10 ppt to about 50 ppt. The compositions of the invention preferably have certain ratios of amine pH buffer to crosslinker and of polymer to crosslinker to achieve stable crosslinking in high TDS/hardness conditions at elevated bottom-hole temperatures. Preferably, around 0.5 to 300 times as much amine pH buffer (by weight) is used relative to the amount of crosslinking agent used. Most preferably, the amount of amine pH buffer (by weight) used is around 3 to 10 times the amount of the crosslinking agent. It is also preferred that 0.15 to 200 times as much polymer (by weight) is used relative to the amount of crosslinking agent used. Most preferably, the amount of polymer (by weight) used is around 1 to 10 times the amount of crosslinking agents.

According to a preferred embodiment for using the preferred composition according to the invention, the polymer is first added to the fracturing fluid, which contains water sources with high levels of TDS, such as produced waters or mixtures of produced waters and fresh waters, to hydrate the polymer and form a gel. The preferred polymer is guar gum. Preferably, the fracturing fluid has a TDS level greater than 1,500 ppm and most preferably greater than 10,000 ppm, with calcium levels greater than 500 ppm and/or magnesium levels greater than 150 ppm. The compositions according to the invention are particularly well suited for use with such fracturing fluids, but the compositions may also be used with fracturing fluids containing other levels of TDS, and specifically calcium and/or magnesium levels which precipitate with conventional hydroxide and/or carbonate buffers. Then a crosslinking agent, amine pH buffer, and optionally a secondary pH buffer are added to the fracturing fluid containing the hydrated polymer. The crosslinking agent and amine pH buffer may be pre-mixed in a solution prior to adding to the fracturing fluid, with a secondary pH buffer and/or additional amine pH buffer (which may further stabilize the crosslinked fluid) optionally added separately. Alternatively, the crosslinking agent and secondary pH buffer may be pre-mixed in a solution prior to adding to the fracturing fluid, with the amine pH buffer added separately. As another alternative, the crosslinking agent, amine pH buffer, and secondary pH buffer (if used) may all be added to the fracturing fluid separately. Water and other agents, such as freeze point depressors, may also be mixed with any of these components or may added to these solutions prior to adding to the fracturing fluid.

When pre-mixed, the crosslinker-amine buffer solution preferably comprises between 2% to 50% by weight of a crosslinking agent, which is preferably a boron compound such as boric acid, and between 1% to 70% by weight of an amine high pH buffer, although this percentage could be as high as 95% by weight when a pure form of an amine high pH buffer (such as pure DETA) is used. Most preferably, the crosslinker-buffer solution comprises between 8%-10% by weight of a cross-linking agent and around 48% to 52% by weight of an amine pH buffer. The amounts of crosslinker and high pH buffer(s) used to achieve the desired crosslinked viscosity in the resulting fracturing fluid will vary depending on the hardness of the water and bottom-hole temperature, as will be apparent to those of skill in the art.

When a secondary pH buffer or modifier, such as potassium hydroxide, sodium hydroxide, ammonium hydroxide, potassium carbonate, or mixtures thereof is used, the crosslinker-buffer solution preferably has between 2% to 30% by weight of a crosslinking agent, 1% to 70% by weight of an amine pH buffer (although this percentage be as high as 90% by weight when a pure form of an amine high pH buffer, such as pure DETA, is used), and 0.1% to 50% by weight (total) of one or more secondary pH buffers or modifiers. Alternatively, the crosslinking agent and the secondary pH buffer may be mixed into a solution that is subsequently mixed with the alkylamine buffer either prior to addition to the fracturing fluid containing the hydrated polymer or as components added separately to the fracturing fluid containing the hydrated polymer. Plexbor 101, commercially available from Chemplex Advanced Materials, LLC, is a preferred crosslinking agent-secondary buffer solution, containing boric acid pre-mixed with potassium hydroxide, and water. When using Plexbor or a similar pre-mixed crosslinker-secondary buffer solution, preferably about 0.25 gpt to about 20 gpt, and more preferably about 0.25 gpt to about 10 gpt is used. The amounts of crosslinker, amine pH buffer(s), and secondary pH buffer(s) (if any) used to achieve the desired crosslinked viscosity in the resulting fracturing fluid will vary depending on the hardness of the water and bottom-hole temperature, as will be apparent to those of skill in the art.

Adding the polymer to the fracturing fluid first and then adding the crosslinker-buffer solution (either with or without a second pH buffer) has the advantage of allowing the polymer to be hydrated by the fracturing fluid to form a gel. The polymer will not hydrate or will be delayed in hydration in the presence of a boron crosslinking agent at an alkaline pH, so it is best to avoid adding the alkylamine pH buffer (and any secondary high pH buffer or modifier) until after the polymer has hydrated. Although it is preferred to pre-mix the crosslinker-buffer solution and add it to the fracturing fluid after the polymer has hydrated, a crosslinking agent that crosslinks at an alkaline pH could be added to the fracturing fluid at the same time as the polymer, provided the overall pH of the fluid is near neutral or acidic to promote hydration, and the amine buffer and any optional secondary pH buffer or modifier added later. The order of addition of the components to the fracturing fluid is not critical provided that the polymer is hydrated before being introduced to the crosslinker at a pH level that would hinder hydration.

Several treatment compositions containing various concentrations of the preferred components (guar, boric acid, and DETA) were prepared and tested for viscosity in timed intervals over 60 minutes. Table 1 below shows the components in the compositions tested in gpt (gallons per thousand gallons of fluid, including the fracturing fluid). A produced water sample was used as the fracturing fluid in each test. Water analysis of the produced water indicated it had a specific gravity of 1.080, a pH of 7.12, no $H_2S$ was detected, and a total dissolved solids of 109,534 mg/l. The water analysis data for specific dissolved minerals in the produced water are shown in Table 2.

TABLE 1

| Test No. | Guar Slurry (gpt) | Boric Acid & Secondary pH Buffer Solution (gpt) | DETA (gpt) | Biocide (gpt) | Low pH Hydration Enhancer (gpt) |
|---|---|---|---|---|---|
| 1 | 5 | 2 | 1 | 0.5 | 0.05 |
| 2 | 5 | 2 | 2 | 0.5 | 0.05 |
| 3 | 5 | 2.5 | 2 | 0.5 | 0.05 |
| 4 | 5 | 2.5 | 2.5 | 0.5 | 0.05 |
| 5 | 5 | 3 | 2.5 | 0.5 | 0.05 |
| 6 | 5 | 2.5 | 3 | 0.5 | 0.05 |

TABLE 2

| Mineral Component | Amount Measured (mg/L) |
|---|---|
| Sodium (calculated) | 38,269 |
| Calcium | 2,800 |
| Magnesium | 972 |
| Iron | 10 |
| Chloride | 66,310 |
| Sulfate | 320 |
| Bicarbonate | 854 |
| TDS (Total Dissolved Solids) | 109,534 |

In these tests, a guar slurry was first added to the produced waters and was blended for 60 minutes to allow the guar to hydrate and form a gel. Then the boric acid and secondary pH buffer solution and DETA were simultaneously added to the produced waters containing the hydrated guar and the entire mixture blended for 30 seconds or until the fluid crosslinked. Once all the components were added, the fluid was then placed in a high temperature high pressure (HTHP) viscometer and the temperature increased from ambient temperature to 146° F. in the first fifteen minutes and held constant at 146° F. for the remainder of the test. This simulates use of the composition in a typical downhole environment, although the compositions according to the invention are useful over a wider temperature range from about 80° F. to about 250° F. The biocide and hydration enhancer were added to the produced waters with the guar slurry, as it is generally preferred to add these additives to the fracturing fluid at an early stage of the process, but the timing and sequence of addition of these optional additives is not critical to the functioning of the compositions according to the invention.

The guar slurry used in these tests comprises guar suspended in a semi-synthetic oil at a concentration of four pounds of guar per gallon of slurry. This slurry is commercially available as Plexgel 907LEB from Chemplex Advanced Materials, LLC. When the slurry is added to the produced water, it is hydrated and forms a viscous gel. The crosslinking agent used in these tests is a boric acid premixed with a secondary pH buffer, potassium hydroxide, and water. This solution is commercially available as Plexbor 101 from Chemplex Advanced Materials, LLC. The biocide and hydration enhancer used are commercially available as Plexicide 24L and Acetiplex 80 (and 80% acetic acid solution), respectively, from Chemplex Advanced Materials, LLC. The biocide and hydration enhancer are usually helpful additives for fracturing operations, but are not necessary to achieve stable crosslinking in the presence of high TDS levels at bottom hole temperatures.

Table 3 below shows the viscosity in centipoise at 40/sec for each of the compositions tested at five minute intervals over the 60 minute period. FIG. 1 shows the viscosity over the 60 minute test period in graphical form.

TABLE 3

| Time (min.) | Temp. (° F.) | Test 1 (cp) | Test 2 (cp) | Test 3 (cp) | Test 4 (cp) | Test 5 (cp) | Test 6 (cp) |
|---|---|---|---|---|---|---|---|
| 5 | 120 | 547 | 609 | 622 | 669 | 618 | 495 |
| 10 | 143 | 394 | 490 | 495 | 676 | 595 | 600 |
| 15 | 146 | 391 | 544 | 513 | 637 | 528 | 611 |
| 20 | 146 | 348 | 516 | 495 | 648 | 489 | 547 |
| 25 | 146 | 316 | 505 | 513 | 588 | 432 | 515 |
| 30 | 146 | 287 | 487 | 507 | 661 | 427 | 552 |
| 35 | 146 | 251 | 480 | 515 | 618 | 419 | 566 |
| 40 | 146 | 224 | 471 | 507 | 611 | 425 | 536 |
| 45 | 146 | 217 | 465 | 495 | 627 | 438 | 555 |
| 50 | 146 | 196 | 468 | 483 | 606 | 436 | 566 |
| 55 | 146 | 168 | 465 | 489 | 621 | 463 | 587 |
| 60 | 146 | 163 | 465 | 521 | 613 | 430 | 560 |

The viscosity measurements indicate the stability of the crosslink between the guar and boron from the boric acid in the presence of high TDS, including high levels of both calcium and magnesium, at an elevated temperature of 146° F. with the use of DETA as a high pH amine buffer. Whereas if the pH does not remain greater than about 9.0 at a bottom-hole test temperature of 146° F., the crosslinking would be reversed (uncrosslink) and the viscosity would drop to less than 50 cp. If the pH remains greater than about 9.0 under the same conditions, the crosslinking is stable and the viscosity will remain at an acceptably high level. It is preferred that at a given polymer loading, the crosslink viscosity be optimized with respect to viscosity which results when proper dosages of boron crosslinkers and stable high pH levels are achieved and maintained through the duration of the test and fracture treatment at the bottom-hole temperature. Typical optimized crosslink viscosity levels from Table 3 ranged from about 430 cp to about 560 cp at 60 minutes at 146 F and are considered acceptable for fracturing operations, while levels less than 200 cp are not generally considered ideal. There are some fluctuations in the viscosity readings, which are to be expected as the composition continues to be mixed together in the produced water as it was blended. As demonstrated by the results in Table 3 and as illustrated in FIG. 1, the readings for Examples 2-6 show stable viscosity levels indicating stable crosslinking and range from an initial viscosity of 669 cp to 430 cp at 60 minutes. Only Test 1 indicated unstable crosslinking by a significant decline in viscosity level from an initial reading of 547 cp to a final 60 minute reading of 163 cp. The composition used in Test 1 had the least amount of DETA, only 1 gpt, compared to 2 to 3 gpt in the other test compositions.

The concentrations of DETA and boric acid in Test 1 were 1 gpt 2 gpt of the overall fluid (including the produced water), respectively, which is below the preferred ratio of the amount of DETA which is 3 times (or more) than the boric acid (by weight) for compositions according to the invention. The amounts of DETA and boric acid in each of Tests 2-6 are within the preferred ratio for an optimized and stable boron crosslink at 146° F. according to the invention. Tests 4 and 6 had the highest viscosity readings. The amounts of DETA and Plexbor 101 in Test 4 were 2.5 gpt and 2.5 gpt of the overall fluid (including the produced water), respectively. Additionally, the amount of Plexgel 907LEB in Test 4 was 5 gpt or 20 ppt guar polymer. The amounts of DETA and Plexbor 101 in Test 6 were 3 gpt and 2.5 gpt of the overall fluid (including the produced water), respectively. Additionally, the amount of Plexgel 907LEB in Test 6 was 5 gpt or 20 ppt guar polymer. These tests demonstrate that compositions having the preferred relative amounts of polymer, crosslinking agent, and pH buffer according to the invention are capable of maintaining a stable pH level, and stable viscosity level, at elevated temperatures in the presence high total dissolved solids in the fracturing fluid.

Another set of tests were run with a different produced water sample and at a temperature of 196° F. Table 4 below shows the components in the compositions tested in gpt (gallons per thousand gallons of fluid, including the fracturing fluid). Water analysis of the produced water used in these tests indicated it had a specific gravity of 1.080, a pH of 6.17, no $H_2S$ was detected, and a total dissolved solids of 112,682 mg/l. The water analysis data for specific dissolved minerals in the produced water are shown in Table 5.

TABLE 4

| Test No. | Guar Slurry (gpt) | Boric Acid & Secondary pH Buffer Solution (gpt) | DETA (gpt) | Biocide (gpt) | Low pH Hydration Enhancer (gpt) |
|---|---|---|---|---|---|
| 7 | 7.5 | 4 | 5 | 0.5 | 0.05 |
| 8 | 7.5 | 4 | 4 | 0.5 | 0.05 |
| 9 | 7.5 | 4 | 3.5 | 0.5 | 0.05 |
| 10 | 7.5 | 4 | 3 | 0.5 | 0.05 |
| 11 | 7.5 | 3.5 | 3.5 | 0.5 | 0.05 |

TABLE 5

| Mineral Component | Amount Measured (mg/L) |
|---|---|
| Sodium (calculated) | 39,629 |
| Calcium | 1,920 |
| Magnesium | 1,567 |
| Iron | 25 |
| Chloride | 68,792 |
| Sulfate | 468 |
| Bicarbonate | 305 |
| TDS (Total Dissolved Solids) | 112,682 |

Figure 2:
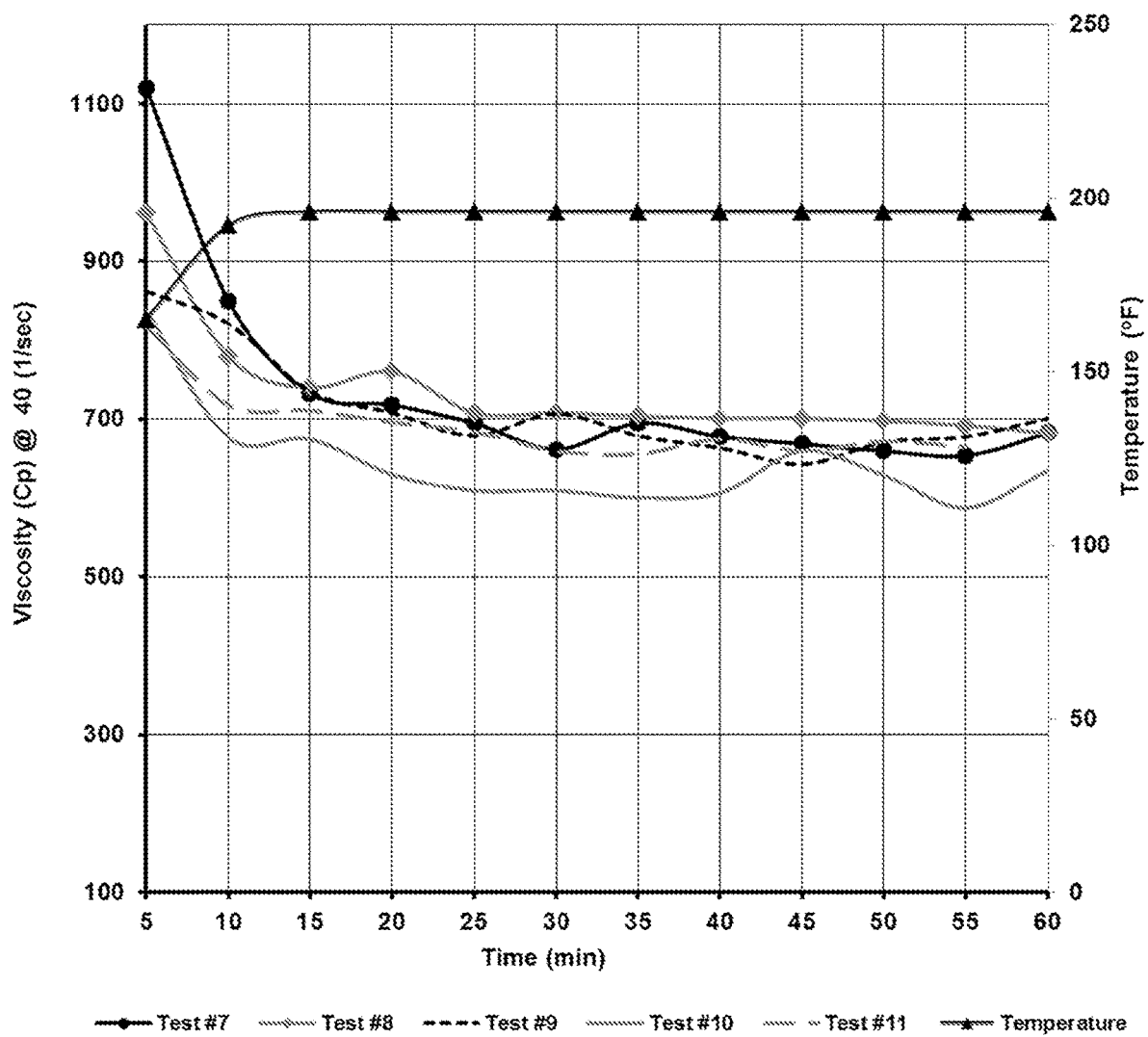
FIG. 2 is a graphical representation of the viscosity over time for several compositions tested.

The guar slurry, biocide, hydration enhancer, crosslinker-buffer solution and amine pH buffer used in these tests are the same as those used for Test Nos. 1-6. The mixing procedures were also the same and the temperature increased from ambient temperature to 196° F. within the first 15 minutes to simulate bottom-hole temperatures. Table 6 below shows the viscosity in centipoise at 40/sec for each of the compositions tested at five minute intervals over the 60 minute period as measured on a high temperature high pressure (HTHP) viscometer. FIG. 2 shows the viscosity over the 60 minute test period in graphical form.

TABLE 6

| Time (min.) | Temp. (° F.) | Test 7 (cp) | Test 8 (cp) | Test 9 (cp) | Test 10 (cp) | Test 11 (cp) |
|---|---|---|---|---|---|---|
| 5 | 165 | 1120 | 961 | 862 | 837 | 818 |
| 10 | 192 | 850 | 780 | 821 | 677 | 718 |
| 15 | 196 | 733 | 740 | 735 | 675 | 711 |
| 20 | 196 | 718 | 760 | 708 | 630 | 696 |
| 25 | 196 | 695 | 708 | 679 | 609 | 684 |
| 30 | 196 | 662 | 708 | 707 | 609 | 660 |
| 35 | 196 | 695 | 704 | 679 | 600 | 656 |
| 40 | 196 | 678 | 701 | 664 | 606 | 675 |
| 45 | 196 | 669 | 701 | 643 | 660 | 660 |
| 50 | 196 | 660 | 698 | 671 | 629 | 672 |
| 55 | 196 | 654 | 692 | 678 | 587 | 665 |
| 60 | 196 | 683 | 682 | 701 | 635 | 638 |

The viscosity measurements indicate the stability of the crosslink between the guar and boron from the boric acid in the presence of high TDS, including high levels of both calcium and magnesium, at an elevated temperature of 196° F. with the use of DETA as a high pH amine buffer. The concentration of DETA used in each of these tests was at least 3.0 gpt and resulted in stable crosslinking, demonstrated by stable viscosity, at 196° F.

Additional tests were conducted using Plexbor 101 (boric acid and potassium hydroxide pH buffer), the same guar slurry as the other tests, and high TDS produced water (containing high levels of calcium and magnesium) as the fracturing fluid, but this time the DETA was omitted. The produced water samples used in these tests were the same as those used in the two previous sets of tests. The polymer did not crosslink in these tests, demonstrating that boron crosslinkers and common buffers are not suitable for use with high TDS fracturing fluids without the addition of an amine pH buffer.

Although test compositions for Test Nos. 2-11 are preferred compositions according to the invention, other compositions may be used within the scope of the invention. Those of ordinary skill in the art will appreciate upon reading this specification, including the examples contained herein, that modifications and alterations to the composition and methodology for using the composition may be made within the scope of the invention and it is intended that the scope of the invention disclosed herein be limited only by the broadest interpretation of the appended claims to which the inventor is legally entitled.

We claim:

1. A method of treating a fracturing fluid to maintain a stable crosslink viscosity, the method comprising:
providing a fracturing fluid comprising produced waters and having a total dissolved solids level greater than 1,500 ppm;
adding a polysaccharide to the fracturing fluid to hydrate the polysaccharide;
adding an alkylamine pH buffer to the fracturing the fluid, the alkylamine pH buffer being capable of maintaining the fracturing fluid at a pH level greater than 9.0 at temperatures greater than about 80° F.;
adding a secondary alkaline pH buffer to the fracturing fluid;

adding a boron crosslinking compound to the fracturing fluid;

wherein the alkylamine pH buffer and the secondary alkaline pH buffer are not added until after the polysaccharide has had sufficient time to hydrate in the fracturing fluid.

2. The method of claim 1 wherein the polysaccharide is mixed with oil to form a slurry comprising about 3-5 pounds of polysaccharide per gallon of slurry prior to adding to the fracturing fluid.

3. The method of claim 2 wherein about 4 to 6 gpt polysaccharide slurry, about 0.4 to 0.6 gpt boron compound, and about 0.5 to 3.5 gpt alkylamine are added to the fracturing fluid.

4. The method of claim 2 wherein the boron crosslinking compound is mixed with a secondary pH buffer having an alkaline pH to form a crosslinker-buffer solution prior to adding to the fracturing fluid.

5. The method of claim 4 wherein about 4 to 6 gpt polysaccharide slurry, about 1.5 to 4 gpt crosslinker-buffer solution, and about 0.5 to 3.5 gpt alkylamine are added to the fracturing fluid.

* * * * *